(12) United States Patent
Nguyen et al.

(10) Patent No.: US 8,746,341 B2
(45) Date of Patent: Jun. 10, 2014

(54) QUATERNARY FOAMERS FOR DOWNHOLE INJECTION

(75) Inventors: Duy T. Nguyen, Houston, TX (US); Fenfen Huang, Sugar Land, TX (US)

(73) Assignee: Nalco Company, Naperville, IL (US)

( * ) Notice: Subject to any disclaimer, the term of this patent is extended or adjusted under 35 U.S.C. 154(b) by 434 days.

(21) Appl. No.: 13/102,251

(22) Filed: May 6, 2011

(65) Prior Publication Data

US 2012/0279715 A1 Nov. 8, 2012

(51) Int. Cl.

| E21B 41/02 | (2006.01) |
|---|---|
| E21B 43/00 | (2006.01) |
| E21B 43/25 | (2006.01) |
| C09K 8/54 | (2006.01) |
| C09K 8/94 | (2006.01) |

(52) U.S. Cl.
USPC ........... 166/309; 166/310; 166/312; 166/371; 166/372; 166/902

(58) Field of Classification Search
USPC .......... 166/309–312, 371, 372, 902; 507/202, 507/240, 244, 247, 266, 939
See application file for complete search history.

(56) References Cited

U.S. PATENT DOCUMENTS

| 2,731,414 A | | 1/1956 | Binder et al. | |
|---|---|---|---|---|
| 3,076,508 A | * | 2/1963 | Lissant | 166/309 |
| 3,275,552 A | * | 9/1966 | Kern et al. | 507/240 |
| 3,330,346 A | | 7/1967 | Jacobs et al. | |
| 3,720,498 A | | 3/1973 | Redmore | |
| 4,778,589 A | | 10/1988 | Reynolds | |
| 5,300,235 A | | 4/1994 | Clewlow et al. | |
| 5,385,206 A | * | 1/1995 | Thomas | 166/267 |
| 5,512,212 A | | 4/1996 | Brown et al. | |
| 5,871,048 A | | 2/1999 | Tokar et al. | |
| 6,143,709 A | | 11/2000 | Carey | |
| 6,488,868 B1 | | 12/2002 | Meyer | |
| 6,630,428 B1 | | 10/2003 | Furman et al. | |
| 7,093,658 B2 | | 8/2006 | Chatterji et al. | |
| 7,122,509 B2 | | 10/2006 | Sanner et al. | |
| 7,204,311 B2 | | 4/2007 | Welton et al. | |
| 7,497,943 B2 | | 3/2009 | Nguyen et al. | |
| 7,971,659 B2 | | 7/2011 | Gatlin et al. | |
| 7,992,653 B2 | | 8/2011 | Zamora et al. | |
| 2001/0009890 A1 | | 7/2001 | Patel et al. | |
| 2004/0110643 A1 | | 6/2004 | Zevallos | |
| 2004/0177968 A1 | * | 9/2004 | Ramachandran | 166/372 |
| 2005/0137114 A1 | * | 6/2005 | Gatlin et al. | 510/424 |
| 2006/0025321 A1 | * | 2/2006 | Treybig et al. | 510/382 |
| 2006/0076139 A1 | * | 4/2006 | Conrad | 166/309 |
| 2006/0128990 A1 | | 6/2006 | Davis et al. | |
| 2007/0079963 A1 | * | 4/2007 | Yang et al. | 166/270 |
| 2007/0125542 A1 | * | 6/2007 | Wei et al. | 166/308.2 |
| 2008/0200351 A1 | | 8/2008 | Dahanayake et al. | |
| 2009/0131283 A1 | | 5/2009 | Nguyen et al. | |
| 2011/0071059 A1 | * | 3/2011 | Nguyen et al. | 507/243 |

FOREIGN PATENT DOCUMENTS

| EP | 0631605 | 4/1999 |
|---|---|---|
| WO | 02/092963 | 11/2002 |
| WO | 2004/020553 | 3/2004 |

* cited by examiner

*Primary Examiner* — George Suchfield
(74) *Attorney, Agent, or Firm* — Edward O. Yonter

(57) ABSTRACT

A method of foaming a fluid for recovering gas from a gas well and enhancing oil production from a gas-lifted oil well penetrating a subterranean oil-bearing formation is disclosed and claimed. The method includes introducing into the fluid a foam-forming amount of a composition comprising at least one compound having the general formula:

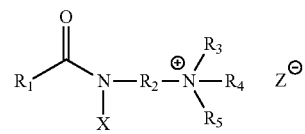

$R_1$ is selected from a saturated linear or branched alkyl, an unsaturated linear or branched alkyl, a substituted naphthalene, a substituted benzene, a natural oil, and a natural oil derivative. $R_2$ is a $C_2$-$C_8$ alkyl. $R_3$, $R_4$, and $R_5$ are independently selected from trimethyl, triethyl, diethyl, monoethyl, benzyl dimethyl, and benzyl diethyl. X is selected from hydrogen, methyl, and ethyl. $Z^-$ is a negatively charged counterion.

21 Claims, 1 Drawing Sheet

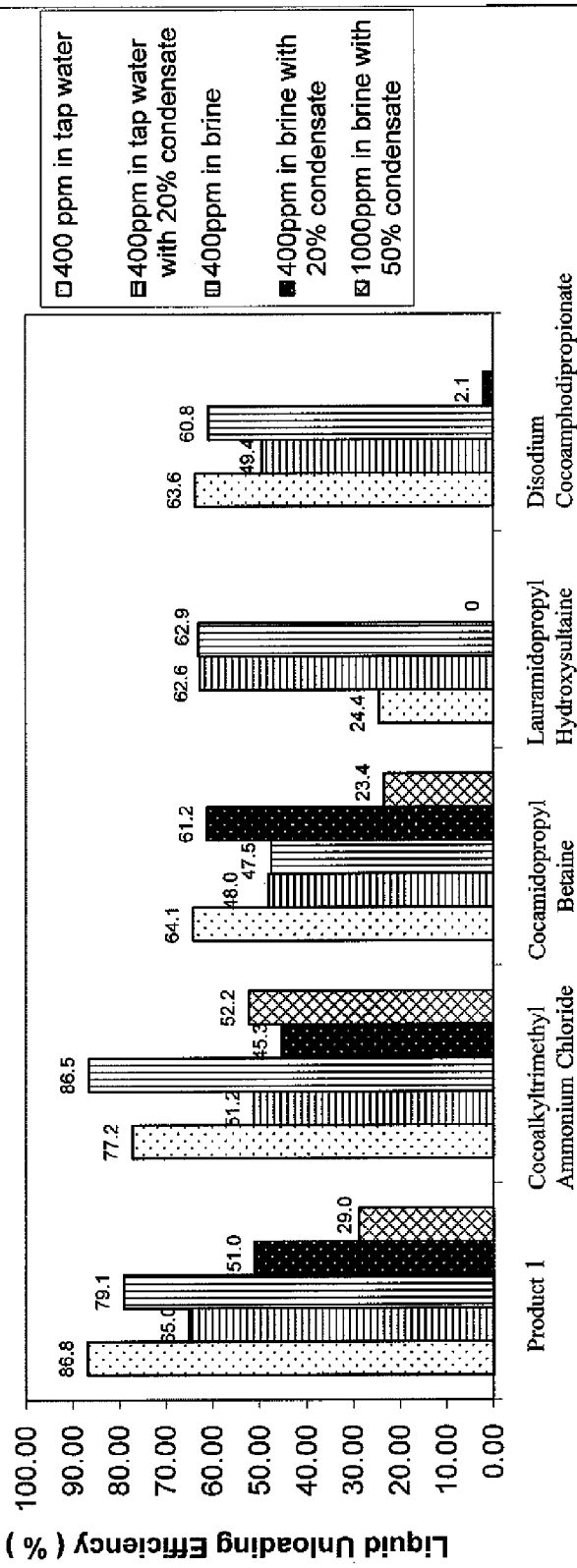

QUATERNARY FOAMERS FOR DOWNHOLE INJECTION

TECHNICAL FIELD

This invention relates generally to methods of using novel foamer compositions for treatment of oil and gas wells to enhance production. More specifically, the invention relates novel foamer compositions for treatment of oil, natural gas wells and coal seam gas (CSG), and additionally provides corrosion protection to production equipment.

BACKGROUND OF THE INVENTION

As natural gas wells mature, gas production decreases due to a decline in reservoir pressure. The formation fluids (i.e., water and liquid hydrocarbon condensate), which result from high production rates, can no longer be lifted from the well and accumulate in the well bore. This accumulation may cause the well to flow erratically at a much lower flow rate and eventually cease production. Foaming agents, also known as foamers, are one of the many methods available to de-water a gas well. Foamers can be applied either by batch treatment or continuous application. With the addition of foamer to the wellbore where the loading liquids are present, foam is generated with agitation from the gas flow. The surface tension and fluid density of the foam are much lower than the liquids so the lighter foam, where the bubble film holds the liquids, is more easily lifted by the low gas flow rate. In oil well production, foamers are also used in conjunction with a gas lift system to enhance oil recovery.

U.S. 2006/0128990 teaches a method of treating a gas well applying a chloride free amphoteric surfactant. U.S. Pat. No. 7,122,509 provides a method of preparing a foamer composition having an anionic surfactant and a neutralizing amine. In U.S. 2005/0137114, an aqueous foaming composition comprising at least one anionic surfactant, cationic surfactant and at least one zwitterionic compound is disclosed. WO 02/092963 and U.S. 2007/0079963 disclose methods for recovering oil from a gas-lifted oil well using a lift gas and a foaming surfactant which consists of nonionic surfactants, anionic surfactants, betaines, and siloxanes.

While the discussed foamers contribute significantly to deliquifying solutions, there is still an ongoing industrial need for other cost-effective foamers which could provide superior foaming performance and provide corrosion protection to production equipment.

SUMMARY OF THE INVENTION

This invention accordingly provides novel foamers and applications for systems without compromising performance, while additionally offering corrosion protection.

In an aspect, the invention relates to a method of foaming a fluid for recovering gas from a gas well and enhancing oil production from a gas-lifted oil well penetrating a subterranean oil-bearing formation. The method includes introducing into the fluid a foam-forming amount of a composition comprising the following formula:

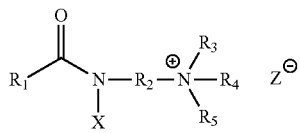

$R_1$ is selected from a saturated linear or branched alkyl, an unsaturated linear or branched alkyl, a substituted naphthalene, a substituted benzene, a natural oil, and a natural oil derivative. $R_2$ is a $C_2$-$C_8$ alkyl. $R_3$, $R_4$, and $R_5$ are independently selected from trimethyl, triethyl, diethyl, monoethyl, benzyl dimethyl, and benzyl diethyl. X is selected from hydrogen, methyl, and ethyl. $Z^-$ is a negatively charged counterion.

It is an advantage of the invention to provide novel foaming agents for downhole injection in oil and gas wells.

It is a further advantage of the invention to provide an efficient method of recovering oil from a gas-lifted oil well penetrating a subterranean oil-bearing formation.

Another advantage of the invention is to provide an efficient method to remove hydrocarbon fluids from a gas-producing well.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

FIG. 1 illustrates dynamic foaming of methyl chloride quaternary of soyamidopropylamine foamer (PRODUCT 1) and other conventional foamers (as explained in Example 1.

DETAILED DESCRIPTION OF THE INVENTION

The method of using the foaming compositions of this invention have been shown to be effective for recovering natural gas from a gas well and recovering crude oil from a gas-lifted oil well penetrating a subterranean oil-bearing formation. That is, the foaming agents of the present invention effectively remove hydrocarbon and/or water or mixtures thereof from the wells. The effective amount of active ingredient in a formulation required to sufficiently foam varies with the system in which it is used. Methods for monitoring foaming rates in different systems are well known to those skilled in the art and may be used to decide the effective amount of active ingredient required in a particular situation. The described compounds may be used to impart the property of foaming to a composition for use in an oil or gas field application.

The described foaming compositions are particularly effective for unloading fluids (oil and/or water) from oil and gas wells under a variety of conditions. These compounds/compositions may be used in wells in which oil cuts in the field can range from about 0% (oil field) to 100% (refinery) oil, while the nature of the water can range from 0 to 300,000 ppm TDS (total dissolved solids). In addition, the bottom hole temperature can be between 60° F. and 400° F. The foamers of the invention can be applied by batch treatments or continuous applications via the casing/tubing annulus or via capillary strings and are typically introduced into the downhole end of a well. An exemplary method and apparatus of introducing foamers through the use of an injection nozzle capable of atomizing the foamer, as disclosed in U.S. Pat. No. 7,311,144. A batch treatment involves the application of a single volume of foamer to the well, as opposed to a smaller volume applied continuously for the case of a continuous application. The next batch is applied after a period of time when the foamer starts to lose its effectiveness or decline in performance.

In an embodiment, the invention relates to a method of foaming a fluid for recovering gas from a gas well and enhancing oil production from a gas-lifted oil well penetrating a subterranean oil-bearing formation. The method includes introducing into the fluid a foam-forming amount of a composition comprising the following formula:

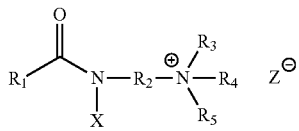

$R_1$ is selected from a saturated linear or branched alkyl, an unsaturated linear or branched alkyl, a substituted naphthalene, a substituted benzene, a natural oil, and a natural oil derivative. $R_2$ is a $C_2$-$C_8$ alkyl. $R_3$, $R_4$, and $R_5$ are independently selected from trimethyl, triethyl, diethyl, monoethyl, benzyl dimethyl, and benzyl diethyl. X is selected from hydrogen, methyl, and ethyl. $Z^-$ is a negatively charged counterion.

In this context, the term "alkyl" refers generally to alkyls known in the art. For example, alkyl may refer to a monovalent group derived from a straight, branched, or cyclic saturated hydrocarbon. Representative alkyl groups include methyl, ethyl, n- and iso-propyl, n-, sec-, iso- and tert-butyl, and the like. In embodiments, $R_1$ is selected from $C_8$-$C_{18}$ alkyls, $C_{12}$-$C_{18}$ alkyls, and combinations thereof.

In an embodiment, $R_1$ is a substituted naphthalene and the composition has the following general structure:

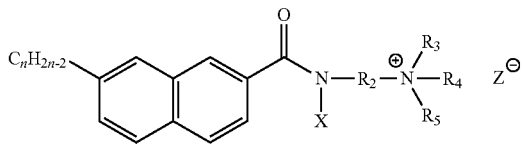

wherein n is from is from 6 to 22. X, $R_2$, $R_3$, $R_4$, $R_5$, and $Z^-$ are as defined herein.

In another embodiment, $R_1$ is a substituted benzene and the composition has the following general structure:

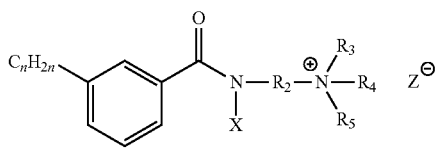

wherein n is from 6 to 22. X, $R_2$, $R_3$, $R_4$, $R_5$, and $Z^-$ are as defined herein.

In embodiments where $R_1$ comprises at least one natural oil. Representative natural oils include soybean oil, coconut oil, olive oil, corn oil, canola oil, peanut oil, combinations thereof, and derivatives thereof. Natural oil derivatives may include, for example, the reaction product of at least one natural oil and dimethylaminopropylamine (DMAPA) to form an amide. A representative reaction product of soybean oil and DMAPA is shown below.

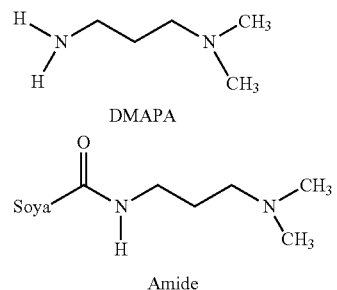

In embodiments, $R_2$ comprises $C_2$-$C_8$ alkyl, $C_2$-$C_6$ alkyl, $C_2$-$C_4$ alkyl, and combinations thereof.

According to various embodiments, the anionic counterion $Z^-$ comprises sulfate ion ($SO_4^{2-}$), biosulfate ion ($HSO_4^-$), sulfite ion ($SO_3^{2-}$), bisulfite ion ($HSO_3^-$), bicarbonate ion ($HCO_3^-$), carbonate ion ($CO_3^{2-}$), hydroxide ion ($OH^-$), halide (fluoride, chloride, bromide, iodide, and combinations thereof), carboxylate, and combinations thereof. Carboxylate may include, for example, a reaction product of mineral acid, acrylic acid, acetic acid, methacrylic acid, glycolic acid, thioglycolic acid, propionic acid, butyric acid, and combinations thereof. $Z^-$ preferably comprises chloride.

A preferred composition for use in the method of the invention is methyl chloride quaternary of soyamidopropylamine. The preparation of methyl chloride quaternary of soyamidopropylamine is well known in the art. The methyl chloride quaternary of soyamidopropylamine of this invention may be prepared by reacting soybean oil with DMAPA to form an amide, The resultant amide may be reacted with methylene chloride to form methyl chloride quaternary of soyamidopropylamine, which is identified as PRODUCT 1 in the examples below.

Foaming agents of the present invention are typically formulated in a mixed solvent package that may contain water, xylene, xylene sulfonate, low molecular weight alcohols, glycols, glycol ethers, the like, and combinations thereof. The use of solvents reduces the viscosity, enhances the liquid unloading efficiency, lowers the freezing point of the foamer and improves compatibility with various components. The use of solvents reduces the viscosity, enhances the liquid unloading efficiency, lowers the freezing point of the foamer and improves compatibility with various components. The solvent is present in an amount ranging from about 5% to about 70%, about 95%, or about 99% by weight actives based on total weight of the composition. The foamer of the present invention is tolerant to high salt and hydrocarbon contents too and thus can be applied in wells with high salinity water or high hydrocarbon contents, in which case the foamer of this invention can remove hydrocarbon and/or water or mixtures from the natural gas and oil wells.

The described foamers or foaming agents of this invention may also be effective for penetrating subterranean oil-bearing or gas-bearing formations to recover natural gas from a gas well or recover crude oil from a gas-lifted oil well. Exemplary gas-lift methods for producing oil are disclosed in U.S. Pat. No. 5,871,048 and U.S. Patent Application No. 2004-0177968 A1. In other words, the foaming agents of the invention may be effective at aiding and making more efficient removal of hydrocarbon and/or water or mixtures thereof from wells. It should be appreciated that in some embodiments other corrosion inhibitors, scale inhibitors, and/or biocides may be used in conjunction with or in formulations including the foamers of this invention.

Corrosion inhibitors are usually formulated in conventional foamers to protect the downhole equipment from corrosive wellbore environment. The foamer of this present invention provides a certain level of corrosion protection, so offers a level of corrosion protection to the downhole equipment. However, in certain cases other corrosion inhibitors may be used in conjunction with the foamer of the invention.

In embodiments, scale inhibitors may also be used in conjunction with the foamer of the present invention. Representative scale inhibitors include polyphosphates, phosphonates, phosphate esters, other suitable scale inhibitors, and combinations thereof.

The composition of this invention can generate stable foams and is preferably present at a level of from about 10 ppm to about 100,000 ppm. A more preferred range is about 100 ppm to about 20,000 ppm. Most preferably, the range is from about 200 ppm to about 10,000 ppm. The foamer composition can optionally include additional actives such as corrosion inhibitor, scale inhibitor, biocide, paraffin dispersant.

Even though this disclosure is directed primarily to oil and gas recovery applications, it is contemplated that the composition of the invention may also be used in other applications. For example, the composition may be used as a deposit control agent or cleaner to remove deposits (e.g., hydrocarbonaceous deposits) from wells and/or pipelines. "Hydrocarbonaceous deposit" refers generally to any deposit including at least one hydrocarbon constituent and forming on the inner surface of flowlines, pipelines, injection lines, wellbore surfaces, storage tanks, process equipment, vessels, the like, and other components in oil and gas applications. Such deposits also include "schmoo," which refers to a solid, paste-like, or sludge-like substance that adheres to almost any surface with which it comes in contact and is particularly difficult to remove. U.S. patent application Ser. No. 11/952,211, "Environmentally Friendly Bis-Quaternary Compounds for Inhibiting Corrosion and Removing Hydrocarbonaceous Deposits in Oil and Gas Applications," filed Dec. 7, 2007, provides representative hydrocarbonaceous deposit controlling agents. Deposits contributing to schmoo may include, for example, sand, clays, sulfur, naphthenic acid salts, corrosion byproducts, biomass, and other hydrocarbonaceous materials bound together with oil. In addition, the foamer of the instant invention may also be used as a paraffin-dispersant, emulsion breaker, corrosion inhibitor, and enhanced oil recovery agent, or in combination with paraffin-dispersants, emulsion breakers, corrosion inhibitors, and enhanced oil recovery agents.

The foregoing may be better understood by reference to the following examples, which are intended for illustrative purposes and are not intended to limit the scope of the invention.

Example 1

The dynamic foaming test apparatus was used for evaluating the liquid unloading efficiency of the foamers. A foaming agent is added to testing fluids, which could be field condensate fluid and tap water or field condensate fluid and synthetic brine (10.2% NaCl and 3.7% $CaCl_2.2H_2O$) in various ratios. 100 g fluid was dosed into a 1000 ml column at the beginning of the test, at the bottom of which a nitrogen gas (7 LPM) blow through a fret glass. The liquid unloading efficiency was calculated by dividing the weight of the liquid removed from the column after 15 min by 100 g. Conventional foaming agents, betaine, sulfobetaine, disodium cocoamphodipropionate, and cocoalkyltrimethyl ammonium chloride were tested as a control. The test results were plotted in FIG. 1.

It can be seen that, due to its high tolerance to chloride and condensate, product 1 is superior to the conventional foamers in terms of liquid unloading efficiency.

Example 2

Corrosion inhibition performances of the foamer of the present invention, formulated with 2-mercaptoethanol and isopropyl alcohol, were evaluated by Wheelbox Test. The Wheelbox Tests were conducted at 176° F. in a rotary oven. The coupons used were mild steel coupons with sandblast finish, which were weighed and placed individually in sample bottles. The test media were 90% sea water and 10% LVT200, which is sparged and saturated with CO2 before the test. Each bottle was dosed with a measured amount of the foamer to be tested. The coupons were then placed in the bottles which were then capped and shaken. The oven was heated to 176° F. and loaded with the coupon-containing bottles. The bottles were rotated in the oven for a period of 24 hours. When the tests were finished, the coupons were cleaned, dried and reweighed. The percent corrosion inhibition was calculated as shown below:

% Corrosion Protection=$(W_b-W_t)/W_b \times 100$ where $W_b$ is the average weight loss of blank unprotected coupon and $W_t$ is the weight loss of treated coupon. The results were summarized in Table 2. It can be seen that PRODUCT 1 of the present invention provided excellent corrosion protection at a low dosage.

TABLE 2

Wheelbox Test Results

| Foamer | Dosage (ppm, active) | % Protection |
|---|---|---|
| Blank | 0 | 0 |
| PRODUCT 1 | 2 | 21.37 |
| PRODUCT 1 | 5 | 74.73 |
| PRODUCT 1 | 10 | 76.6 |
| PRODUCT 1 | 20 | 80.65 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of foaming a fluid for recovering gas from a gas well and enhancing oil production from a gas-lifted oil well penetrating a subterranean oil-bearing formation, the method comprising: introducing into the fluid a foam-forming amount of a composition comprising the following general structure:

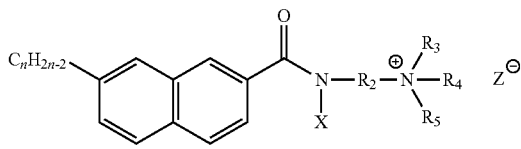

wherein:
(i) $R_2$ is a $C_2$-$C_8$ alkyl;
(ii) $R_3$, $R_4$, and $R_5$ are independently selected from: trimethyl, triethyl, diethyl, monoethyl, benzyl dimethyl, and benzyl diethyl;
(iii) X is selected from hydrogen, methyl, and ethyl;
(iv) $Z^-$ is a negatively charged counterion; and
(v) n is from 6 to 22.

2. The method of claim 1, wherein the natural oil is selected from: soybean oil, coconut oil, olive oil, corn oil, canola oil, peanut oil, combinations thereof, and derivatives thereof.

3. The method of claim 1, wherein the natural oil derivative is formed via reacting at least one of the natural oils with dimethylaminopropylamine (DMAPA) to form an amide.

4. The method of claim 1, wherein $R_2$ is selected from $C_2$-$C_8$ alkyl, $C_2$-$C_6$ alkyl, $C_2$-$C_4$ alkyl, and combinations thereof.

5. The method of claim 1, wherein $Z^-$ is selected from: halide, carboxylate, and combinations thereof.

6. The method of claim 5, wherein the halide is selected from: fluoride, chloride, bromide, iodide, and combinations thereof.

7. The method of claim 5, wherein the carboxylate is a reaction product of an amine with a member selected from the group consisting of mineral acid, acrylic acid, acetic acid, methacrylic acid, glycolic acid, thioglycolic acid, propionic acid, butyric acid, and combinations thereof.

8. The method of claim 1, wherein $Z^-$ is selected from: $SO_3^{2-}$, $HSO_3^-$, $SO_4^{2-}$, $HSO_4$, $HCO_3^-$, $CO_3^{2-}$, $OH^-$, and combinations thereof.

9. The method of claim 1, wherein $Z^-$ is chloride.

10. The method of claim 1, further comprising a solvent.

11. The method of claim 10, wherein the solvent is selected from the group consisting of: water; xylene; xylene sulfonate; potassium formate; low molecular weight alcohols; glycols; glycol ethers; and combinations thereof.

12. The method of claim 10, wherein the solvent is present in an amount ranging from about 5 to about 70% by weight based on a total weight of the composition.

13. The method of claim 10, wherein the solvent is present in an amount ranging from about 5 to about 95% by weight based on a total weight of the composition.

14. The method of claim 10, wherein the solvent is present in an amount ranging from about 5 to about 99% by weight based on a total weight of the composition.

15. The method of claim 1, further comprising wherein the composition includes an additive selected from the group consisting of: corrosion inhibitor, scale inhibitor, biocide, paraffin dispersant.

16. The method of claim 1, further comprising introducing into the fluid the foam-forming amount of the foaming composition to the downhole end of a well as batch addition or continuously.

17. The method of claim 1, further comprising introducing to the fluid from about 10 ppm to about 100,000 ppm of the composition, based on volume of the fluid.

18. The method of claim 1, further comprising introducing to the fluid from about 100 ppm to about 20,000 ppm of the composition, based on volume of the fluid.

19. The method of claim 1, further comprising introducing to the fluid from about 200 ppm to about 10,000 ppm of the composition, based on volume of the fluid.

20. The method of claim 1, wherein the fluid is liquid hydrocarbon and water.

21. A method of foaming a fluid for recovering gas from a gas well and enhancing oil production from a gas-lifted oil well penetrating a subterranean oil-bearing formation, the method comprising: introducing into the fluid a foam-forming amount of a composition comprising the following general structure:

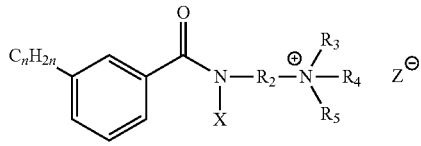

wherein (i) n is from 6 to 22, (ii) $R_2$ is a $C_2$-$C_8$ alkyl, (iii) $R_3$, $R_4$, and $R_5$ are independently selected from: trimethyl, triethyl, diethyl, monoethyl, benzyl dimethyl, and benzyl diethyl, (iv) X is selected from hydrogen, methyl, and ethyl, and (v) $Z^-$ is a negatively charged counterion.

* * * * *